(12) United States Patent
Bielfelt et al.

(10) Patent No.: US 11,752,846 B2
(45) Date of Patent: *Sep. 12, 2023

(54) TRAILER COVER SYSTEM

(71) Applicant: Timpte Industries, Inc., Denver, CO (US)

(72) Inventors: Terry J. Bielfelt, Omaha, NE (US); Ryan H. Bakersfield, Lincoln, NE (US)

(73) Assignee: Timpte Industries, Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/847,713

(22) Filed: Jun. 23, 2022

(65) Prior Publication Data
US 2022/0396129 A1 Dec. 15, 2022

Related U.S. Application Data

(63) Continuation of application No. 17/071,542, filed on Oct. 15, 2020, now Pat. No. 11,396,221.

(60) Provisional application No. 62/915,330, filed on Oct. 15, 2019.

(51) Int. Cl.
*B60J 7/04* (2006.01)
*B60J 7/08* (2006.01)
*B60P 7/04* (2006.01)

(52) U.S. Cl.
CPC ............... *B60J 7/085* (2013.01); *B60P 7/04* (2013.01)

(58) Field of Classification Search
CPC .................................. B60J 7/085; B60P 7/04
USPC .......................................................... 296/98
See application file for complete search history.

(56) References Cited

U.S. PATENT DOCUMENTS

| | | | |
|---|---|---|---|
| 9,150,086 B1 * | 10/2015 | Royer | B62D 33/04 |
| 9,669,752 B2 * | 6/2017 | Bielfelt | B60J 7/085 |
| 2015/0151663 A1 * | 6/2015 | Schmeichel | B60P 7/04 29/401.1 |
| 2016/0332557 A1 * | 11/2016 | Royer | B60J 11/02 |
| 2018/0147923 A1 * | 5/2018 | Liu | F16H 37/041 |

* cited by examiner

*Primary Examiner* — Joseph D. Pape
(74) *Attorney, Agent, or Firm* — Mallory M. Henninger; Advent, LLP

(57) ABSTRACT

A system can include a motor for driving a tarp roller across a trailer for covering and uncovering the trailer with a tarp. The system can also include a power supply for powering the motor. The system can further include a sensor coupled with the motor for sensing power consumed by the motor as the motor is powered to drive the tarp roller across the trailer. A controller can be communicatively coupled with the sensor and operatively coupled to the motor and the power supply for switching an energy characteristic of the power supplied to the motor from the power supply between a first characteristic associated with a lower torque and a second characteristic associated with a higher torque by monitoring the power consumed by the motor and switching the energy characteristic when the power consumed by the motor indicates the lower torque is insufficient to drive the tarp roller.

20 Claims, 4 Drawing Sheets

TRAILER COVER SYSTEM

CROSS-REFERENCE TO RELATED APPLICATIONS

The present application is a continuation under 35 U.S.C. § 120 of U.S. patent application Ser. No. 17/071,542, filed Oct. 15, 2020, and titled "TRAILER COVER SYSTEM," which claims the benefit under 35 U.S.C. § 119(e) of U.S. Provisional Application Ser. No. 62/915,330, filed Oct. 15, 2019, and titled "TRAILER COVER SYSTEM." U.S. patent application Ser. No. 17/071,542 and U.S. Provisional Application Ser. No. 62/915,330 are herein incorporated by reference in their entireties.

BACKGROUND

A tarp (e.g., a tarpaulin sheet or cover) can be used to cover a trailer used to haul loose materials, such as dirt, sand, gravel, and so forth. For example, a tarp can be used to cover a trailer and prevent or reduce quantities of loose material from being blown and/or scattered from the trailer.

DRAWINGS

The Detailed Description is described with reference to the accompanying figures. The use of the same reference numbers in different instances in the description and the figures may indicate similar or identical items.

DETAILED DESCRIPTION

Figure 1:
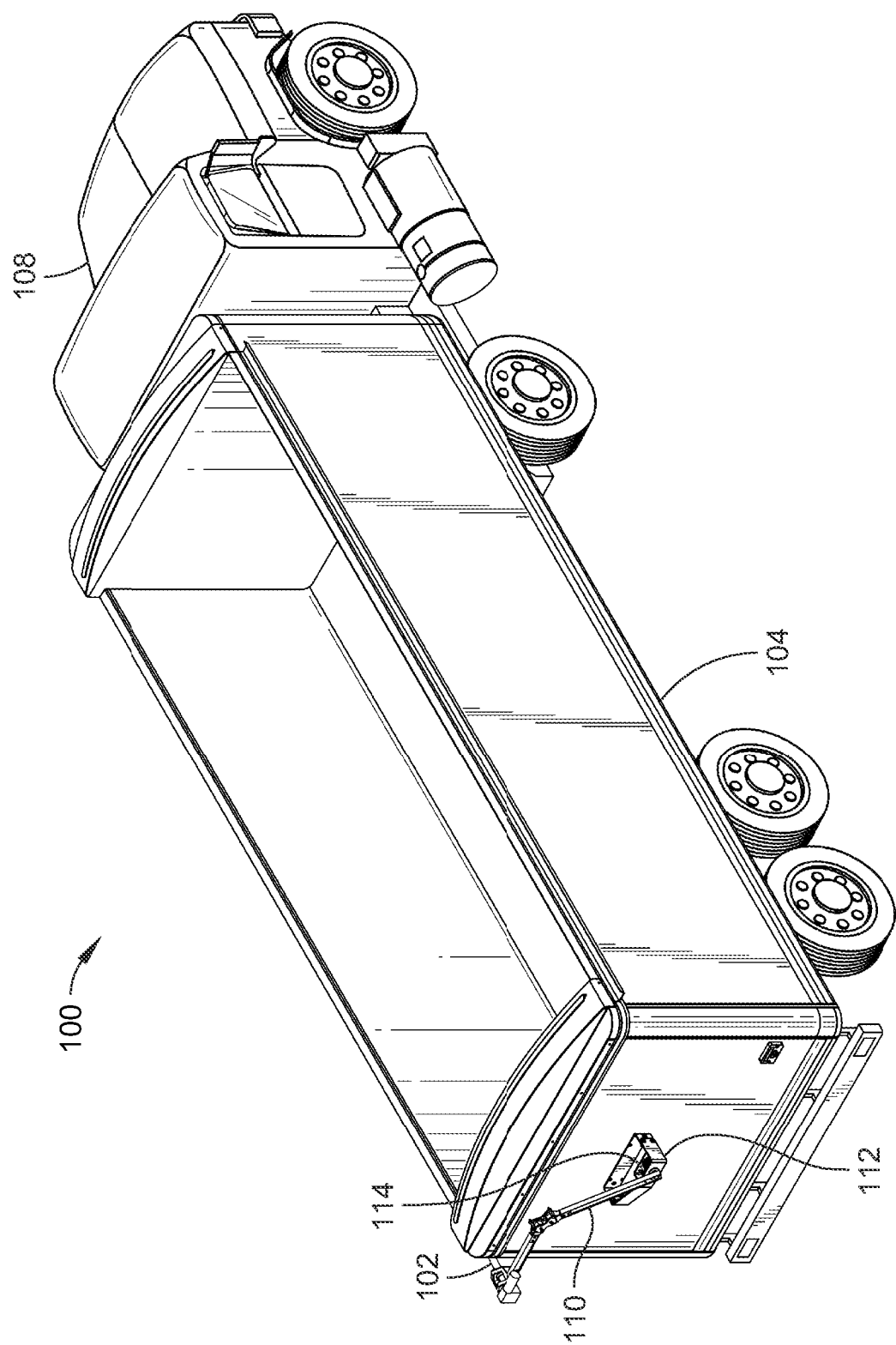
FIG. 1 is an isometric view illustrating a trailer connected to a towing vehicle, where the trailer includes an arm configured to roll and unroll a tarp supported by a tarp roller and a motor for driving the arm and the tarp roller across the trailer in accordance with example embodiments of the present disclosure.
Figure 2:
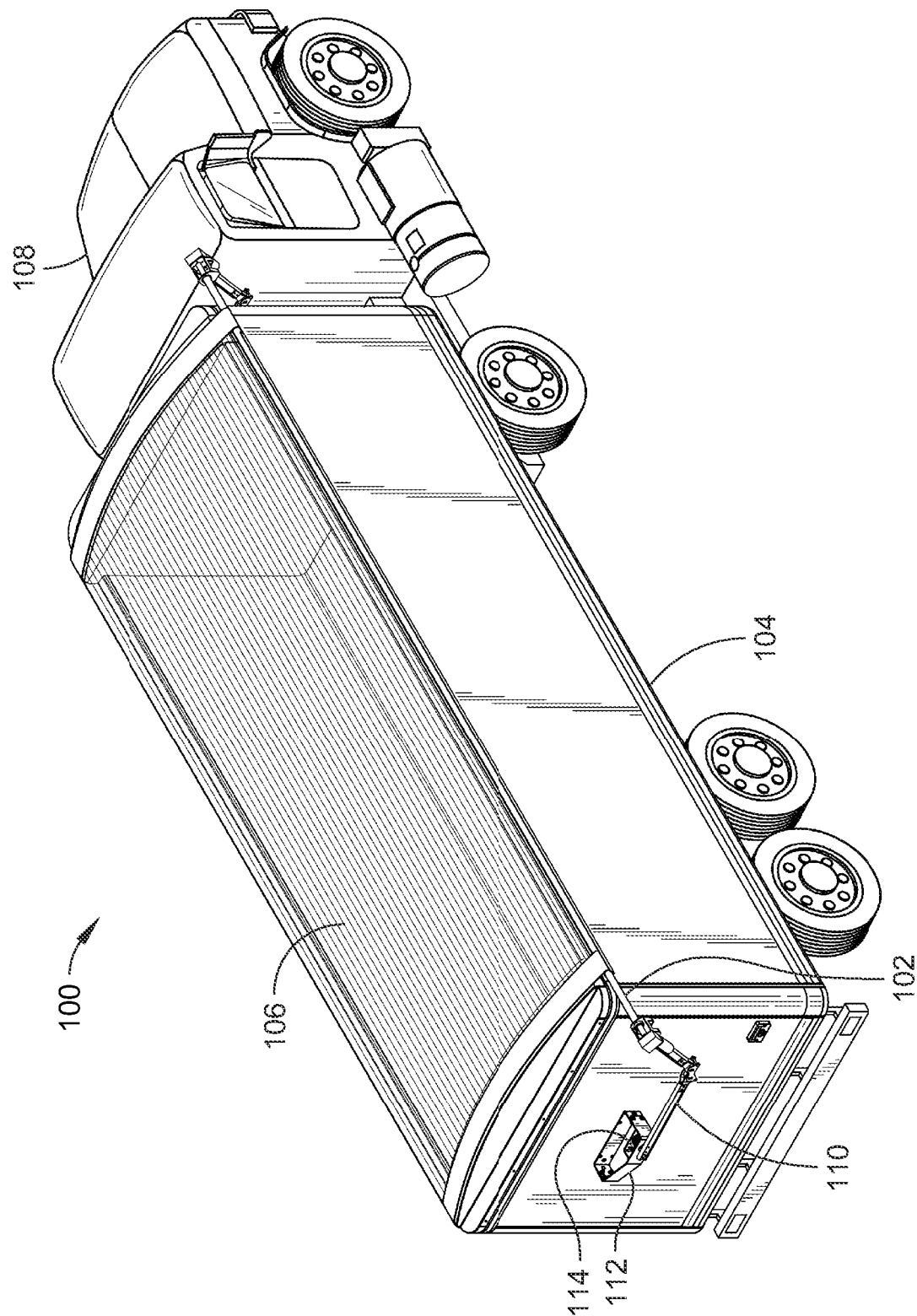
FIG. 2 is another isometric view of the trailer illustrated in FIG. 1, where the arm has been actuated to cover the trailer with the tarp.
Figure 3:
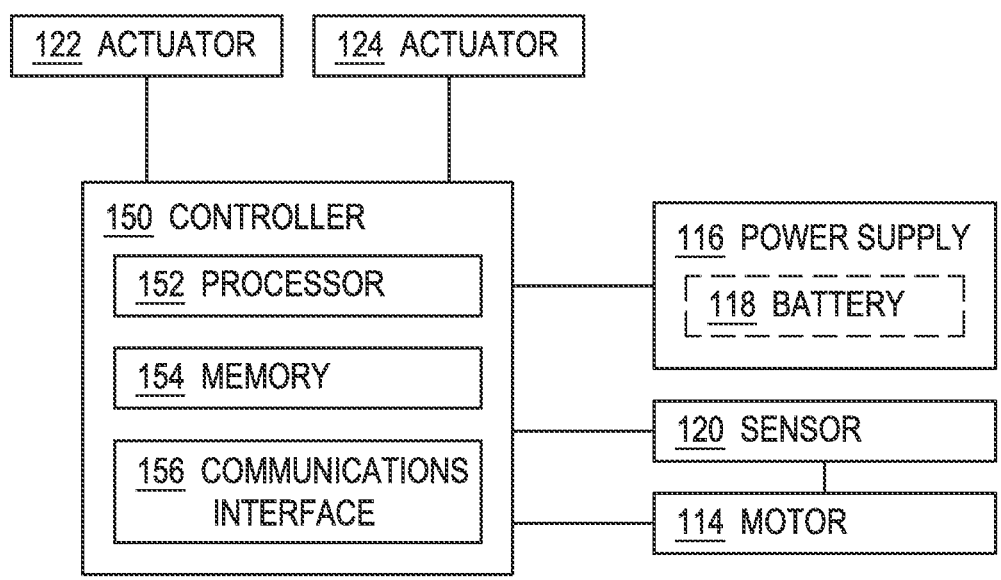
FIG. 3 is a block diagram illustrating a system including a motor for driving a tarp roller, a sensor for sensing an operational characteristic of the motor, and a controller for operating the motor based upon its operational characteristic in accordance with example embodiments of the present disclosure.

Referring generally to FIGS. 1 through 3, systems 100 for covering and uncovering a trailer are described in accordance with example embodiments of the present disclosure. The systems 100 include a tarp roller 102 that is configured to translate across a trailer 104 to cover and uncover the trailer 104 with a tarp 106, e.g., deploying and/or stowing the tarp 106. For example, the tarp 106 can be supported by the tarp roller 102 to be rolled and unrolled as the tarp roller 102 translates across the trailer 104. The systems 100 can be used to cover a trailer 104 and protect dry bulk commodities from moisture, contamination, and loss.

As described, a trailer 104 can be, for example, a trailer used to haul loose materials, such as dirt, sand, gravel, and so forth. The tarp 106 can be used to cover the trailer 104 and prevent or reduce quantities of loose material from being blown and/or scattered from the trailer 104. In embodiments of the disclosure, a trailer 104 can extend longitudinally behind a towing vehicle 108, and the tarp roller 102 can extend lengthwise along the length of the trailer 104. In other embodiments, the tarp roller 102 may extend widthwise along the width of the trailer 104. The tarp roller 102 can have a roll of tarp 106 fastened to it. As the tarp roller 102 is translated across the width and/or length of the trailer 104, the tarp 106 can be unrolled to cover the trailer 104. Then, the tarp roller 102 can be translated across the trailer 104 in an opposite direction to roll the tarp 106 and uncover the trailer 104. The tarp roller 102 and the tarp 106 can then be stowed (e.g., at a side of the trailer 104, at an end of the trailer 104).

In some embodiments, the system 100 also includes one or more arms 110 (e.g., radial arms) for translating the tarp roller 102 across the trailer 104. An arm 110 can be configured to attach to a mount 112 at an end and/or a side of the trailer 104. For example, an arm 110 can be included at a front end of the trailer 104, and another arm 110 can be included at a rear end of the trailer. Each arm 110 can be rotationally coupled with its respective trailer end. By actuating (e.g., rotating) one or more of the arms 110, the tarp roller 102 can be used to roll and unroll the tarp 106. In some embodiments, the mount 112 can include a motor 114 or another actuation device for rolling and/or unrolling the tarp 106. Further, the mount 112 can include one or more biasing mechanisms (e.g., springs) for biasing an arm 110 toward a desired orientation (e.g., toward one side and/or end of the trailer 104). Additionally, the tarp roller 102 can include a spline and/or another attachment point or mechanism for allowing an operator to roll and/or unroll the tarp 106 by hand (e.g., by connecting a handle to the spline and rotating the tarp roller 102, and so forth).

In some embodiments, the system 100 can also include a stop (e.g., a tarp stop) for stopping and/or holding the rolled tarp in place on the trailer 104. A tarp stop can include a tarp stop bracket with a casting to hold a rolled tarp in place, where the casting can be rotationally fixed with respect to the bracket using, for example, a pin. In embodiments, a stop may also include a frame mounted to a side wall and/or and end wall of the trailer 104. The frame can include a support with opposing hangers extending from the support. The hangers can be used to support the tarp roller 102, which itself can support, for example, a rolled tarp. The frame can also include a tab extending from the support between the opposing hangers. The hangers can define a pivot attachment spaced apart from the support. For example, apertures are defined in the hangers through which a pin can be inserted to provide a pivot. A latch can be connected at the pivot attachment between the hangers, and the latch can rotate at the pivot attachment between a generally downwardly extending orientation and a generally upwardly extending orientation. The tab can prevent the latch from contacting the side wall when the latch is in the generally downwardly extending orientation. In this example, the stop can also include a pin to hold a rolled tarp in place.

One or more tarp rollers 102, trailers 104, tarps 106, towing vehicles 108, arms 110, mounts 112, motors 114, splines, stops, and/or other components of the systems 100 disclosed herein may be implemented as described in U.S. Pat. No. 9,669,752, issued Jun. 6, 2017, and titled "Arms for Translating a Tarp Roller Across a Trailer and a Tarp Stop for a Tarp Supported by the Tarp Roller," which is herein incorporated by reference in its entirety. Additionally, one or more motors 114 and/or other components of the systems 100 disclosed herein may be implemented as described in U.S. Patent Publication No. US 2018/0147923 A1, published May 31, 2018, and titled "Tarp Motor Assembly," which is herein incorporated by reference in its entirety. For example, a motor 114 can be implemented using a gearing system that is not back-drivable (or at least substantially not back-drivable) such as a worm gear drive system. However, a worm gear drive system is provided by way of example and is not meant to limit the present disclosure. In other embodiments, the motor 114 can be implemented using one or more other gearing systems, such as a planetary gear system, an epicyclic gear system, and so forth.

As described, one or more motors 114 of a system 100 are coupled with the tarp roller 102 for driving the tarp roller 102 across the trailer 104. A motor 114 can be, for example, an electric motor. The system 100 may also include a power supply 116, such as a battery 118 of the towing vehicle 108, or another power source for supplying power to the motor 114 (e.g., an auxiliary battery, a generator, etc.). In embodiments, a sensor 120 (e.g., an electrical current sensor or another type of sensor) can be coupled with the motor 114 for sensing power consumed by the motor 114 as the motor 114 is powered to drive the tarp roller 102 across the trailer 104. In embodiments, the power supply 116 may be capable of supplying power at different voltage levels. However, the available amount of power capable of being supplied by the power supply 116 may dictate that less current is available at a higher voltage level while more current is available at a lower voltage level.

The systems 100 also include a controller 150 communicatively coupled with the sensor 120 and operatively coupled to the motor 114 and the power supply 116 for switching an energy characteristic (e.g., voltage) of the power supplied to the motor 114 from the power supply 116 between a first characteristic (e.g., a first voltage, such as 18 volts or 24 volts) associated with a lower torque and a second characteristic (e.g., a second voltage less than the first voltage, such as 12 volts) associated with a higher torque. The controller 150 can be configured to monitor the power consumed by the motor 114 (e.g., as indicated by amperage sensed by the sensor 120) and switch the energy characteristic from the first characteristic (e.g., 18 volts, 24 volts) to the second characteristic (e.g., 12 volts) when the amperage indicates the lower torque is insufficient to drive the tarp roller 102.

In some embodiments, the controller 150 is configured to supply an increased target voltage (e.g., 18 volts, 24 volts) to the motor 114 when the input current to the motor 114 is less a maximum predetermined input current for the motor 114. The voltage supplied by the controller 150 may be greater than the source voltage of the battery 118 (e.g., eighteen volts (18 V) or twenty-four volts (24 V) versus twelve volts (12 V)). In some embodiments, input current to the motor 114 may be at least approximately equal to the motor current multiplied by a ratio of the motor voltage to the input voltage to the motor 114. In an example where the motor current is about ten amperes (10 A), the increased motor voltage is about eighteen volts (18 V), and the input voltage to the motor 114 is about twelve volts (12 V), the input current may be about 10 A*18V/12 V, or about fifteen amperes (15 A).

If the motor load causes the input current to the motor 114 to exceed a predetermined threshold (e.g., its maximum input current), voltage to the motor 114 can be reduced by the controller 150, which may reduce input current. Reducing the motor voltage can decrease the motor current and can also lower the ratio of the input current to the motor current. Thus, as described herein, when a motor load causes the motor current to exceed the maximum input current (e.g., when the motor voltage has been reduced to the input voltage), the increased voltage (voltage boost) to the motor 114 may be reduced to a lesser voltage (e.g., a reduced voltage of about twelve volts (12 V) in some embodiments). In an example, the predetermined threshold for maximum input current may be about thirty amperes (30 A). Further, the increased (boosted) motor voltage may be about eighteen volts (18 V) and may range up to about twenty-four volts (24 V). However, eighteen volts (18 V) and twenty-four volts (24 V) are provided by way of example and are not meant to limit the present disclosure. In other embodiments, the boosted voltage may be less than about eighteen volts (18 V), between eighteen and twenty-four volts (18-24 V), greater than twenty-four volts (24 V), and so forth.

The systems 100 as described herein can be used to increase the speed at which a tarp 106 can be rolled and unrolled to cover a trailer 104. For example, in operation, the controller 150 can employ an actuator 122 (e.g., an actuation button, such as an "OPEN" button) operatively connected to cause the controller 150 to supply power from the power supply 116 to the motor 114 to open the tarp 106. In some embodiments, the actuator 122 can be on a keypad connected via a wireless and/or wired connection to the controller 150. In other embodiments, the actuator 122 can be a remote (e.g., in the form of a small electronic device, such as a key fob). The controller 150 can energize the motor 114 with power at the first characteristic (e.g., 18 volts, 24 volts, etc.) associated with lower torque/higher speed (e.g., twenty-six (26) revolutions per minute) to wind the tarp 106 from under a latch plate and roll the tarp 106 over the trailer 104 until it reaches one or more tarp stops on, for instance, the curb side of the trailer.

When the tarp 106 rolls against the tarp stops, the controller 150 monitoring the sensor 120 can detect the higher amperage draw of the motor 114 and can be configured to automatically reduce the energization of the motor 114, i.e., switching the energy characteristic of power supplied to the motor 114 from the first characteristic voltage (e.g., 18 volts or 24 volts) to the second characteristic (e.g., 12 volts) associated with higher torque/lower speed (e.g., thirteen (13) revolutions per minute). In this manner, the tarp 106 can be rolled at a higher speed, while still being able to be drawn up against the tarp stops when the higher speed/lower torque operational parameters are insufficient to further drive the tarp roller 102. In some embodiments, the amperage sensed by the sensor 120 that causes the controller 150 to switch the power supplied to the motor 114 from 18 volts or 24 volts to 12 volts when opening the tarp can be an amperage of about thirty amperes (30 A). This amperage value can be preset and stored by the controller 150 (e.g., in an electronic memory).

Additionally, the controller 150 can be operatively coupled to the motor 114 and the power supply 116 for switching an energy characteristic (e.g., voltage) of the power supplied to the motor 114 from the power supply 116 to another (e.g., third) characteristic (e.g., zero volts) associated with not powering the motor 114. The controller 150 can be configured to monitor the power consumed by the motor 114 (e.g., as indicated by amperage sensed by the sensor 120) and switch the energy characteristic to the third characteristic (e.g., zero volts) when the amperage indicates the tarp roller 102 has reached an end of its travel (e.g., has reached one or more stops). In some embodiments, the amperage sensed by the sensor 120 that causes the controller 150 to switch the power supplied to the motor 114 from 18 volts, 24 volts, or 12 volts to zero volts when opening the tarp can be an amperage of about thirty amperes (30 A). This amperage value can also be preset and stored by the controller 150 (e.g., in an electronic memory). Thus, once at the present amperage limit, the supply of electrical power to the motor 114 can be stopped.

In another example operation, the controller 150 can employ another actuator 124 (e.g., an actuation button, such as a "CLOSE" button) operatively connected to cause the controller 150 to supply power from the power supply 116 to the motor 114 to close the tarp 106. For instance, as previously described, the actuator 124 can be on a keypad and/or a remote connected via a wireless and/or wired connection to the controller 150. The controller 150 can energize the motor 114 with power at the first characteristic (e.g., 18 volts, 24 volts, etc.) associated with lower torque/higher speed to unwind the tarp 106, e.g., while tension on one or more springs in the arms 110 pulls the tarp 106 over the trailer 104. The tarp 106 can continue to unwind, e.g., down a side of the trailer 104 until it reaches, for example, the latch plate on the road side of the trailer 104.

When the tarp 106 rolls up under the latch plate, the controller 150 monitoring the sensor 120 can detect the higher amperage draw of the motor 114 and can be configured to automatically reduce the energization of the motor 114, i.e., switching the energy characteristic of power supplied to the motor 114 from the first characteristic voltage (e.g., 18 volts or 24 volts) to the second characteristic (e.g., 12 volts) associated with higher torque/lower speed. In this manner, the tarp 106 can be unrolled at a higher speed, while still being able to be drawn up under the latch plate when the higher speed/lower torque operational parameters are insufficient to further drive the tarp roller 102. In some embodiments, the amperage sensed by the sensor 120 that causes the controller 150 to switch the power supplied to the motor 114 from 18 volts or 24 volts to 12 volts when closing the tarp can be an amperage of about thirty amperes (30 A). This amperage value can be preset and stored by the controller 150 (e.g., in an electronic memory).

Additionally, the controller 150 can be operatively coupled to the motor 114 and the power supply 116 for switching an energy characteristic (e.g., voltage) of the power supplied to the motor 114 from the power supply 116 to another (e.g., third) characteristic (e.g., zero volts) associated with not powering the motor 114. The controller 150 can be configured to monitor the power consumed by the motor 114 (e.g., as indicated by amperage sensed by the sensor 120) and switch the energy characteristic to the third characteristic (e.g., zero volts) when the amperage indicates the tarp roller 102 has reached an end of its travel (e.g., has reached one or more latch plates). In some embodiments, the amperage sensed by the sensor 120 that causes the controller 150 to switch the power supplied to the motor 114 from 18 volts, 24 volts, or 12 volts to zero volts when closing the tarp can be an amperage of about thirty amperes (30 A). This amperage value can also be preset and stored by the controller 150 (e.g., in an electronic memory). Thus, once at the present amperage limit, the supply of electrical power to the motor 114 can be stopped. In some embodiments, the preset amperage value causing the controller 150 to stop powering the motor 114 when closing the tarp may be greater than the amperage value causing the controller 150 to stop powering the motor 114 when opening the tarp (e.g., to allow the tarp 106 to be cinched tightly against or under, for example, a latch plate).

Referring now to FIG. 3, a system 100, including some or all of its components, can operate under computer control. For example, a processor can be included with or in a system 100 to control the components and functions of systems 100 described herein using software, firmware, hardware (e.g., fixed logic circuitry), manual processing, or a combination thereof. The terms "controller," "functionality," "service," and "logic" as used herein generally represent software, firmware, hardware, or a combination of software, firmware, or hardware in conjunction with controlling the systems 100. In the case of a software implementation, the module, functionality, or logic represents program code that performs specified tasks when executed on a processor (e.g., central processing unit (CPU) or CPUs). The program code can be stored in one or more computer-readable memory devices (e.g., internal memory and/or one or more tangible media), and so on. The structures, functions, approaches, and techniques described herein can be implemented on a variety of commercial computing platforms having a variety of processors.

The motor 114, power supply 116, sensor 120, and so forth can be coupled with the controller 150 for controlling the operation of the motor 114 and the opening and closing of the tarp 106. The controller 150 can include a processor 152, a memory 154, and a communications interface 156. The processor 152 provides processing functionality for the controller 150 and can include any number of processors, micro-controllers, or other processing systems, and resident or external memory for storing data and other information accessed or generated by the controller 150. The processor 152 can execute one or more software programs that implement techniques described herein. The processor 152 is not limited by the materials from which it is formed or the processing mechanisms employed therein and, as such, can be implemented via semiconductor(s) and/or transistors (e.g., using electronic integrated circuit (IC) components), and so forth.

The memory 154 is an example of tangible, computer-readable storage medium that provides storage functionality to store various data associated with operation of the controller 150, such as software programs and/or code segments, or other data to instruct the processor 152, and possibly other components of the controller 150, to perform the functionality described herein. Thus, the memory 154 can store data, such as a program of instructions for operating the system 100 (including its components), and so forth. It should be noted that while a single memory 154 is described, a wide variety of types and combinations of memory (e.g., tangible, non-transitory memory) can be employed. The memory 154 can be integral with the processor 152, can comprise stand-alone memory, or can be a combination of both.

The memory 154 can include, but is not necessarily limited to: removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In implementations, the controller 150 and/or the memory 154 can include removable integrated circuit card (ICC) memory, such as memory provided by a subscriber identity module (SIM) card, a universal subscriber identity module (USIM) card, a universal integrated circuit card (UICC), and so on.

The communications interface 156 is operatively configured to communicate with components of the system 100.

For example, the communications interface 156 can be configured to transmit data for storage in the system 100, retrieve data from storage in the system 100, and so forth. The communications interface 156 is also communicatively coupled with the processor 152 to facilitate data transfer between components of the system 100 and the processor 152 (e.g., for communicating inputs to the processor 152 received from a device communicatively coupled with the controller 150). It should be noted that while the communications interface 156 is described as a component of a controller 150, one or more components of the communications interface 156 can be implemented as external components communicatively coupled to the system 100 via a wired and/or wireless connection. The system 100 can also comprise and/or connect to one or more input/output (I/O) devices (e.g., via the communications interface 156), including, but not necessarily limited to: a display, a mouse, a touchpad, a keyboard, and so on.

The communications interface 156 and/or the processor 152 can be configured to communicate with a variety of different networks, including, but not necessarily limited to: a wide-area cellular telephone network, such as a 3G cellular network, a 4G cellular network, or a global system for mobile communications (GSM) network; a wireless computer communications network, such as a WiFi network (e.g., a wireless local area network (WLAN) operated using IEEE 802.11 network standards); an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example only and is not meant to limit the present disclosure. Further, the communications interface 156 can be configured to communicate with a single network or multiple networks across different access points.

Figure 4:
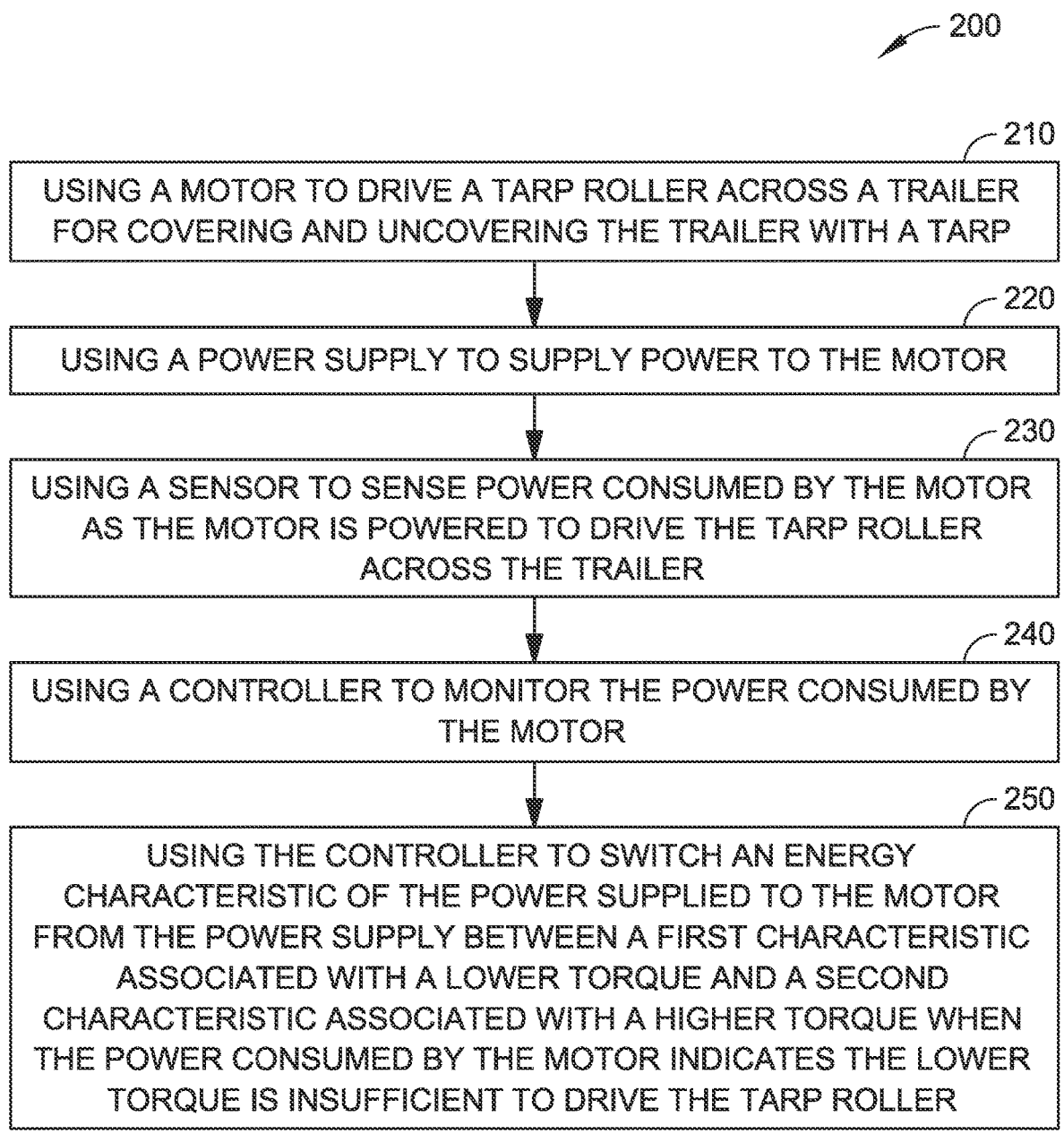
FIG. 4 is a flow diagram illustrating a method of covering and uncovering a trailer using a motor for driving a tarp roller across the trailer, a sensor for sensing an operational characteristic of the motor, and a controller for operating the motor based upon the operational characteristic of the motor in accordance with example embodiments of the present disclosure.

The following discussion describes example techniques for covering and uncovering a trailer using a motor for driving a tarp roller across the trailer, a sensor for sensing an operational characteristic of the motor, and a controller for operating the motor based upon its operational characteristic. FIG. 4 depicts a process 200, in an example implementation, for operating a motor, such as the example motor illustrated in FIGS. 1 through 3 and described above. In the process 200 illustrated, a motor is used to drive a tarp roller across a trailer for covering and uncovering the trailer with a tarp (Block 210). For example, with reference to FIGS. 1 through 3, motor 114 drives tarp roller 102 across trailer 104 to cover and uncover the trailer with tarp 106. A power supply is used to supply power to the motor (Block 220). For instance, with continuing reference to FIGS. 1 through 3, power supply 116 (e.g., battery 118) is used to power motor 114.

A sensor is used to sense power consumed by the motor as the motor is powered to drive the tarp roller across the trailer (Block 230). For example, with continuing reference to FIGS. 1 through 3, amperage sensor 120 senses the power consumed by motor 114. A controller is used to monitor the power consumed by the motor (Block 240). For instance, with continuing reference to FIGS. 1 through 3, controller 150 is communicatively coupled with sensor 120 for monitoring the current drawn by motor 114. The controller is then used to switch an energy characteristic of the power supplied to the motor from the power supply between a first characteristic associated with a lower torque and a second characteristic associated with a higher torque when the power consumed by the motor indicates the lower torque is insufficient to drive the tarp roller (Block 250). For example, controller 150 is operatively coupled to motor 114 and power supply 116 and switches the voltage supplied to motor 114 from eighteen (18) volts or twenty-four (24) volts to twelve (12) volts when drawing the tarp roller against tarp stops, under latch plates, and so forth.

Generally, any of the functions described herein can be implemented using hardware (e.g., fixed logic circuitry such as integrated circuits), software, firmware, manual processing, or a combination thereof. Thus, the blocks discussed in the above disclosure generally represent hardware (e.g., fixed logic circuitry such as integrated circuits), software, firmware, or a combination thereof. In the instance of a hardware configuration, the various blocks discussed in the above disclosure may be implemented as integrated circuits along with other functionality. Such integrated circuits may include all of the functions of a given block, system, or circuit, or a portion of the functions of the block, system, or circuit. Further, elements of the blocks, systems, or circuits may be implemented across multiple integrated circuits. Such integrated circuits may comprise various integrated circuits, including, but not necessarily limited to: a monolithic integrated circuit, a flip chip integrated circuit, a multichip module integrated circuit, and/or a mixed signal integrated circuit. In the instance of a software implementation, the various blocks discussed in the above disclosure represent executable instructions (e.g., program code) that perform specified tasks when executed on a processor. These executable instructions can be stored in one or more tangible computer readable media. In some such instances, the entire system, block, or circuit may be implemented using its software or firmware equivalent. In other instances, one part of a given system, block, or circuit may be implemented in software or firmware, while other parts are implemented in hardware.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A system comprising:
   a tarp roller configured to translate across a trailer for covering and uncovering the trailer with a tarp;
   a motor coupled with the tarp roller for driving the tarp roller across the trailer;
   a sensor coupled with the motor for sensing power consumed by the motor as the motor is powered to drive the tarp roller across the trailer; and
   a controller communicatively coupled with the sensor and operatively coupled to the motor for switching an energy characteristic of the power supplied to the motor between a first characteristic associated with a lower torque and a second characteristic associated with a higher torque, the controller configured to monitor the power consumed by the motor and switch the energy characteristic from the first characteristic to the second characteristic when the power consumed by the motor indicates the lower torque is insufficient to drive the tarp roller.

2. The system as recited in claim 1, wherein the motor comprises an electric motor and the sensor comprises an electrical current sensor.

3. The system as recited in claim 2, wherein the first characteristic comprises a first voltage to be supplied to the motor and the second characteristic comprises a second voltage to be supplied to the motor, the second voltage less than the first voltage.

4. The system as recited in claim 3, wherein the first voltage comprises between about eighteen (18) volts and about twenty-four (24) volts, and the second voltage comprises about twelve (12) volts.

5. The system as recited in claim 1, wherein the controller is operatively coupled to the motor for switching the energy characteristic of the power supplied to the motor to a third characteristic associated with not powering the motor when the power consumed by the motor indicates the tarp roller has reached an end of its travel.

6. The system as recited in claim 1, wherein the motor is at least substantially not back-drivable.

7. The system as recited in claim 1, wherein the power consumed by the motor that causes the controller to switch between the first characteristic associated with the lower torque and the second characteristic associated with the higher torque is indicated by an amperage sensed by the sensor of about thirty amperes (30 A).

8. A method comprising:
driving, via a motor, a tarp roller across a trailer for covering and uncovering the trailer with a tarp;
supplying power to the motor;
sensing, via a sensor, power consumed by the motor as the motor is powered to drive the tarp roller across the trailer;
monitoring, via a controller, the power consumed by the motor; and
switching, via the controller, an energy characteristic of the power supplied to the motor between a first characteristic associated with a lower torque and a second characteristic associated with a higher torque when the power consumed by the motor indicates the lower torque is insufficient to drive the tarp roller.

9. The method as recited in claim 8, wherein the motor comprises an electric motor and the sensor comprises an electrical current sensor.

10. The method as recited in claim 8, wherein the first characteristic comprises a first voltage to be supplied to the motor and the second characteristic comprises a second voltage to be supplied to the motor, the second voltage less than the first voltage.

11. The method as recited in claim 10, wherein the first voltage comprises between about eighteen (18) volts and about twenty-four (24) volts, and the second voltage comprises about twelve (12) volts.

12. The method as recited in claim 8, further comprising switching the energy characteristic of the power supplied to the motor to a third characteristic associated with not powering the motor when the power consumed by the motor indicates the tarp roller has reached an end of its travel.

13. The method as recited in claim 8, wherein the motor is at least substantially not back-drivable.

14. The method as recited in claim 8, wherein sensing, via the sensor, power consumed by the motor as the motor is powered to drive the tarp roller across the trailer includes sensing an amperage, and the power consumed by the motor that indicates the lower torque is insufficient to drive the tarp roller is indicated when the amperage is about thirty amperes (30 A).

15. A system comprising:
a tarp roller configured to translate across a trailer for covering and uncovering the trailer with a tarp;
an electric motor coupled with the tarp roller for driving the tarp roller across the trailer;
an electrical current sensor coupled with the electric motor for sensing power consumed by the electric motor as the electric motor is powered to drive the tarp roller across the trailer; and
a controller communicatively coupled with the electrical current sensor and operatively coupled to the electric motor for switching an energy characteristic of the electric motor between a first voltage associated with a lower torque and a second voltage associated with a higher torque, the controller configured to monitor the power consumed by the electric motor and switch the energy characteristic from the first voltage to the second voltage when the power consumed by the electric motor indicates the lower torque is insufficient to drive the tarp roller.

16. The system as recited in claim 15, wherein the second voltage is less than the first voltage.

17. The system as recited in claim 16, wherein the first voltage comprises between about eighteen (18) volts and about twenty-four (24) volts, and the second voltage comprises about twelve (12) volts.

18. The system as recited in claim 15, wherein the controller is operatively coupled to the electric motor for switching the energy characteristic of the power supplied to the electric motor to a third voltage associated with not powering the electric motor when the power consumed by the electric motor indicates the tarp roller has reached an end of its travel.

19. The system as recited in claim 15, wherein the electric motor is at least substantially not back-drivable.

20. The system as recited in claim 15, wherein the power consumed by the electric motor that causes the controller to switch between the first voltage associated with the lower torque and the second voltage associated with the higher torque is indicated by an amperage sensed by the sensor of about thirty amperes (30 A).

* * * * *